US012472513B2

(12) United States Patent
Jonsson

(10) Patent No.: US 12,472,513 B2
(45) Date of Patent: Nov. 18, 2025

(54) DISC STACK, ROTOR UNIT, CENTRIFUGAL SEPARATOR, METHOD OF PROVIDING DISC STACK, AND METHOD OF PROVIDING ROTOR UNIT

(71) Applicant: Alfdex AB, Landskrona (SE)

(72) Inventor: Patrik Jonsson, Huddinge (SE)

(73) Assignee: ALFDEX AB, Landskrona (SE)

( * ) Notice: Subject to any disclaimer, the term of this patent is extended or adjusted under 35 U.S.C. 154(b) by 546 days.

(21) Appl. No.: 17/772,362

(22) PCT Filed: Nov. 6, 2020

(86) PCT No.: PCT/EP2020/081286
§ 371 (c)(1),
(2) Date: Apr. 27, 2022

(87) PCT Pub. No.: WO2021/094217
PCT Pub. Date: May 20, 2021

(65) Prior Publication Data

US 2022/0401966 A1 Dec. 22, 2022

(30) Foreign Application Priority Data

Nov. 14, 2019 (EP) .................................... 19209240

(51) Int. Cl.
*B04B 5/12* (2006.01)
*B04B 7/14* (2006.01)

(52) U.S. Cl.
CPC .................. *B04B 5/12* (2013.01); *B04B 7/14* (2013.01); *B04B 2005/125* (2013.01)

(58) Field of Classification Search
CPC ........ B04B 5/12; B04B 7/14; B04B 2005/125
See application file for complete search history.

(56) References Cited

U.S. PATENT DOCUMENTS 2,104,683 A 1/1938 Rosen et al.
2,569,567 A * 10/1951 Korn ...................... B01D 45/14 55/408

(Continued)

FOREIGN PATENT DOCUMENTS

CN 102227265 A 10/2011
CN 102227266 A 10/2011

(Continued)

OTHER PUBLICATIONS

International Search Report, isued in PCT/EP2020/081286, dated Feb. 8, 2021.

(Continued)

*Primary Examiner* — Dung H Bui
(74) *Attorney, Agent, or Firm* — Birch, Stewart, Kolasch & Birch, LLP

(57) ABSTRACT

A disc stack of frustoconical separation discs is configured to be mounted in a separation chamber of a centrifugal separator. The discs are stacked upon each other in a manner forming narrow separation spaces between adjacent discs. The discs are welded to each other at radially outer portions of the discs. A rotor unit for a centrifugal separator, a centrifugal separator including a rotor unit, a method of providing a disc stack of frustoconical separation discs, and a method of providing a rotor unit for a centrifugal separator are also disclosed.

10 Claims, 8 Drawing Sheets

(56) References Cited

U.S. PATENT DOCUMENTS

| | | | | |
|---|---|---|---|---|
| 2,808,201 | A | 10/1957 | Mayeux | |
| 4,427,407 | A * | 1/1984 | Paschedag | B04B 1/12 494/76 |
| 4,460,393 | A * | 7/1984 | Saget | B04B 5/12 209/714 |
| 4,729,760 | A * | 3/1988 | Saget | B04B 5/12 209/714 |
| 5,575,912 | A | 11/1996 | Herman et al. | |
| 5,735,789 | A * | 4/1998 | Borgstrom | B04B 1/08 494/70 |
| 5,746,789 | A | 5/1998 | Wright et al. | |
| 5,795,477 | A | 8/1998 | Herman et al. | |
| 6,526,794 | B1 * | 3/2003 | Langer | B21D 22/16 72/364 |
| 6,973,925 | B2 | 12/2005 | Sauter et al. | |
| 7,445,653 | B2 | 11/2008 | Trautmann et al. | |
| 7,731,772 | B2 | 6/2010 | Lagerstedt et al. | |
| 8,657,908 | B2 | 2/2014 | Eliasson | |
| 10,940,489 | B2 * | 3/2021 | Hagqvist | B04B 7/14 |
| 2003/0178014 | A1 | 9/2003 | Sauter et al. | |
| 2004/0107681 | A1 * | 6/2004 | Carlsson | B04B 9/06 55/406 |
| 2005/0198932 | A1 | 9/2005 | Franzen et al. | |
| 2006/0100083 | A1 * | 5/2006 | Lagerstedt | B04B 7/14 494/70 |
| 2009/0137378 | A1 * | 5/2009 | Klintenstedt | B04B 7/14 494/60 |
| 2011/0209513 | A1 * | 9/2011 | Klintenstedt | B21D 26/021 72/60 |
| 2011/0212821 | A1 * | 9/2011 | Mackel | B04B 7/14 494/68 |
| 2012/0174544 | A1 | 7/2012 | Tornblom et al. | |
| 2012/0174547 | A1 | 7/2012 | Törnblom et al. | |
| 2014/0148327 | A1 * | 5/2014 | Nilsson | B04B 1/08 72/208 |
| 2014/0221187 | A1 * | 8/2014 | Konig | B04B 1/08 494/70 |
| 2015/0119225 | A1 * | 4/2015 | Inge | B04B 7/14 494/70 |
| 2015/0126353 | A1 * | 5/2015 | Hagqvist | B04B 1/08 494/72 |
| 2016/0303579 | A1 * | 10/2016 | Nilsson | B04B 7/14 |
| 2018/0141057 | A1 * | 5/2018 | Hagqvist | B04B 11/02 |
| 2020/0197955 | A1 * | 6/2020 | Shanov | F04C 29/0092 |
| 2021/0046490 | A1 * | 2/2021 | Lüersmann | B04B 5/12 |
| 2021/0362166 | A1 * | 11/2021 | Månsson | B04B 7/14 |
| 2022/0388016 | A1 * | 12/2022 | Hadamik | B04B 1/08 |

FOREIGN PATENT DOCUMENTS

| | | | |
|---|---|---|---|
| CN | 107771103 | A | 3/2018 |
| CN | 108230097 | A | 7/2018 |
| CN | 108883425 | A | 11/2018 |
| DE | 100 44 615 | A1 | 4/2002 |
| DE | 10 2010 054 516 | A1 | 6/2012 |
| JP | 2005-515065 | A | 5/2005 |
| JP | 2009-532204 | A | 9/2009 |
| JP | 2012-532743 | A | 12/2012 |
| KR | 10-2008-0113274 | A | 12/2008 |
| KR | 10-2012-0034788 | A | 4/2012 |
| KR | 10-2014-0039723 | A | 4/2014 |
| KR | 10-1409695 | B1 | 6/2014 |
| WO | WO 96/27445 | A1 | 9/1996 |
| WO | WO 02/20954 | A1 | 3/2002 |
| WO | WO 03/061838 | A1 | 7/2003 |
| WO | WO 2004/020105 | A2 | 3/2004 |
| WO | WO 2005/123220 | A1 | 12/2005 |
| WO | WO 2007/114766 | A1 | 10/2007 |
| WO | WO 2010/030095 | A1 | 4/2010 |
| WO | WO 2010/039099 | A1 | 4/2010 |
| WO | WO 2011/005160 | A1 | 1/2011 |
| WO | WO 2016/170090 | A1 | 10/2016 |
| WO | WO 2017/063914 | A1 | 4/2017 |
| WO | WO 2017/178248 | A1 | 10/2017 |

OTHER PUBLICATIONS

Written Opinion of the International Searcing Authority, isued in PCT/EP2020/081286, dated Feb. 8, 2021.

English translation of the Chinese Office Action and Search Report for corresponding Chinese Application No. 202080078939.3, dated Jun. 30, 2023.

English translation of the Japanese Office Action for corresponding Japanese Application No. 2022-528111, daled Jul. 10, 2023.

English translation of Korean Office Action for Korean Application No. 10-2022-7019322, dated Sep. 26, 2023.

* cited by examiner

DISC STACK, ROTOR UNIT, CENTRIFUGAL SEPARATOR, METHOD OF PROVIDING DISC STACK, AND METHOD OF PROVIDING ROTOR UNIT

TECHNICAL FIELD

The present disclosure relates to a disc stack of frustoconical separation discs configured to be mounted in a separation chamber of a centrifugal separator, such as a crankcase gas separator. The present disclosure further relates to a rotor unit for a centrifugal separator, a centrifugal separator comprising a rotor unit, a method of providing a disc stack of frustoconical separation discs configured to be mounted in a separation chamber of a centrifugal separator, and a method of providing a rotor unit for a centrifugal separator.

BACKGROUND

A mixture of fluids having different densities may be separated from one another through use of a centrifugal separator. A centrifugal separator comprises a rotor unit rotating at high rotational speeds to generate centrifugal forces separating the fluids having different densities. The rotor unit may comprise a disc stack of frustoconical separation discs arranged adjacent to each other with narrow separation spaces between adjacent discs.

Centrifugal separators are used for various purposes. One specific use of a centrifugal separator is to separate a liquid phase from crankcase gases of an internal combustion engine. Crankcase gases of an internal combustion engine derive from gas leaking past piston rings from combustion chambers of the internal combustion engine to the crankcase of the engine. This continuous leaking of gas into the crankcase can lead to an undesirable increase of pressure within the crankcase and, as a consequence, to a need to vent gas from the casing. Crankcase gases typically carries a quantity of engine oil, as droplets or a fine mist, as well as other liquid hydrocarbons, soot, and other solid combustion residues. These substances may be environmentally harmful substances. Therefore, for certain types of combustion engines, legislation requires crankcase gases to be disposed of in an environmentally friendly manner.

In some internal combustion engines, the crankcase gases are led to an inlet of the combustion engine. In this way, the crankcase gases will not directly be vented out to the surrounding air. However, functionality of the internal combustion engine may be adversely affected by the presence of oil in the inlet air, particularly for engines comprising a turbocharging system wherein the efficiency of a compressor of the turbocharging system can be adversely affected, as well as the durability thereof. Therefore, it is an advantage if the crankcase gas is cleaned to remove oil particles carried by the gas prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in the document U.S. Pat. No. 8,657,908.

The rotor of a centrifugal separator can for example be driven by a hydraulic drive arrangement or an electric drive arrangement. Some hydraulic drive arrangements utilize impact force, e.g. where a liquid jet strikes a turbine wheel to create the rotational force. However, other drive arrangements are also contemplated, in particular a reaction drive where a liquid jet is discharged from a rotor in a tangential direction, at a position offset from the rotational axis of the rotor, thereby providing the rotational force of the rotor. An example of such a drive arrangement can be found in the document US 2005/0198932 A1.

In many cases, centrifugal separators operate in demanding environments where the centrifugal separator is subjected to a considerable amount of vibration. Moreover, the high rotational velocity of the rotor unit put strain on the centrifugal separator. In rare cases, displacement of the discs of the disc stack of the rotor unit can occur, which can be detrimental to the function of the centrifugal separator. Therefore, when producing components for a centrifugal separator, it is an advantage if it is ensured that the components are durable enough to last the lifetime of the engine.

Furthermore, generally, on today's consumer market, it is an advantage if products, such as centrifugal separator and associated components, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a disc stack of frustoconical separation discs configured to be mounted in a separation chamber of a centrifugal separator, preferably a crankcase gas separator. The discs are stacked upon each other in a manner forming narrow separation spaces between adjacent discs, and wherein the discs are welded to each other at radially outer portions of the discs.

Since the discs are welded to each other at radially outer portions of the discs, a rigid and durable disc stack is provided. Moreover, subsequent displacement of the discs of the disc stack can be avoided. Furthermore, since the discs are welded to each other at radially outer portions of the discs, a disc stack is provided having conditions and characteristics suitable for being manufactured and assembled in a quick and cost-efficient manner. This is because the process of welding the discs to each other significantly facilitates the manufacturing and assembling of the disc stack.

Accordingly, a disc stack is provided overcoming, or at least alleviating, at least some of the above-mentioned problems and drawbacks. As a result, the above-mentioned object is achieved.

Optionally, the discs are made of a non-metallic material, preferably a polymeric material. Thereby, a light-weight disc stack can be provided, and a disc stack is provided having conditions for a further facilitated manufacturing thereof. This is because the process of welding the discs to each other can be significantly facilitated.

Optionally, the discs comprise welding sections at radially outer portions of the discs, and wherein the discs are welded to each other via the welding sections. Thereby, a further rigid and durable disc stack is provided. Moreover, since the discs are welded to each other via the welding sections, a disc stack is provided having conditions and characteristics suitable for being manufactured and assembled in a yet quicker and more cost-efficient manner. This is because the process of welding the discs to each other is significantly facilitated.

Optionally, the welding sections protrude from a frustoconical surface of the respective disc. Since the welding sections protrude from the frustoconical surface of the respective disc, conditions are provided for obtaining a continuous and coherent weld of welding sections. Thereby, a further rigid and durable disc stack can be provided. Moreover, a disc stack is provided having conditions and characteristics suitable for being manufactured and assembled in a further quicker and more cost-efficient manner. This is because the process of welding the discs to each other can be significantly facilitated.

Optionally, the welding sections separate the discs in a manner forming at least portions of the narrow separation spaces between adjacent discs. Thereby, a disc stack is provided in which the welding sections facilitate the process of welding and acts as spacers for separating the discs in a manner forming at least portions of the narrow separation spaces between adjacent discs. As a result thereof, a disc stack is provided having conditions and characteristics suitable for being manufactured and assembled in a further quicker and more cost-efficient manner. This is because the disc stack can be compressed in an axial direction thereof, before, and/or during, the welding of the welding sections. In this manner, uniform narrow separation spaces between adjacent discs can be provided in a quick, simple, and reliable manner, and the compression force may ensure a rigid and durable disc stack. Furthermore, the need for a compression spring compressing the disc stack in the axial direction during assembly and use thereof is circumvented. This is because when welded, the welding sections may ensure that a compression force is obtained between the discs of the disc stack. Accordingly, due to these features, a lighter, more rigid, and more durable disc stack can be provided in a cost efficient manner.

Optionally, the welding sections protrude radially from the discs. Thereby, the process of welding the discs to each other is significantly facilitated. Moreover, the welding sections can be aligned relative to each other in a simpler manner before welding the discs to each other. Accordingly, due to these features, a disc stack is provided having conditions and characteristics suitable for being manufactured and assembled in a further quicker and more cost-efficient manner.

Optionally, each disc comprises at least three welding sections, preferably circumferentially distributed. Thereby, a rigid and durable disc stack can be provided.

Optionally, the discs are welded to each other along aligned welding sections. Thereby, the process of welding the discs to each other is significantly facilitated. Moreover, a more rigid and durable disc stack is provided. Accordingly, due to these features, a disc stack is provided having conditions and characteristics suitable for being manufactured and assembled in a further quicker and more cost-efficient manner.

According to a second aspect of the invention, the object is achieved by a rotor unit for a centrifugal separator, preferably a crankcase gas separator, wherein the rotor unit comprises a disc stack according to some embodiments of the present disclosure, and a first end disc at a first axial end of the disc stack and a second end disc at a second axial end of the disc stack.

Since the discs of the disc stack are welded to each other at radially outer portions of the discs, a rigid and durable rotor unit is provided. Moreover, subsequent displacement of the discs of the disc stack can be avoided. Furthermore, since the discs of the disc stack are welded to each other at radially outer portions of the discs, a rotor unit is provided having conditions and characteristics suitable for being manufactured and assembled in a quick and cost-efficient manner. This is because the process of welding the discs of the disc stack to each other significantly facilitates the manufacturing and assembling of the disc stack.

Accordingly, a rotor unit is provided overcoming, or at least alleviating, at least some of the above-mentioned problems and drawbacks. As a result, the above-mentioned object is achieved.

Optionally, each of the first and second end discs is welded to the disc stack at radially outer portions of the end disc and radially outer portions of a disc of the disc stack being adjacent to the end disc. Thereby, a rotor unit is provided having conditions and characteristics suitable for being manufactured and assembled in a further quicker and more cost-efficient manner. This is because the first and second end discs are attached to the disc stack with the same manufacturing method as the discs of the disc stacks. As a further result of these features, the first and second end discs and the discs of the disc stack can be attached to each other using one welding step, which further facilitates assembling and manufacturing of the rotor unit.

Optionally, the rotor unit comprises a drive shaft interface for connection of a drive shaft to at least one of the first and second end discs, or the rotor unit comprises a drive shaft connected to or integrated with at least one of the first and second end discs. Thereby, the rotor unit can be brought into rotation in a separation chamber of a centrifugal separator in a simple, efficient, and reliable manner.

Optionally, at least a proportion of the discs are rotationally locked to the drive shaft only via welds at radially outer portions of the discs. Thereby, a lightweight rotor unit can be provided. Moreover, a rotor unit is provided having conditions for an improved fluid flow characteristics. This is because conditions are provided for more space radially inside the discs of the disc stack and the need for separate holding structures is circumvented for rotationally locking the discs to the drive shaft.

Optionally, the rotor unit is configured to rotate around a rotation axis during operation in a separation chamber of a centrifugal separator, preferably a crankcase gas separator, wherein the rotor unit comprises a hollow space radially inside the discs of the disc stack, and wherein the hollow space extends through the rotation axis. Thereby, a lightweight rotor unit can be provided. Moreover, a rotor unit is provided having conditions for an improved fluid flow characteristics. This is because the hollow space provides conditions for having a large space available radially inside the discs of the disc stack.

According to a third aspect of the invention, the object is achieved by a centrifugal separator for gas separation, preferably a crankcase gas separator, wherein the centrifugal separator comprises a rotor unit according to some embodiments of the present disclosure.

Since the centrifugal separator comprises a rotor unit according to some embodiments, a centrifugal separator is provided having conditions and characteristics suitable for being manufactured and assembled in a quick and cost-efficient manner. Moreover, a centrifugal separator is provided having a robust and durable rotor unit.

Accordingly, a centrifugal separator is provided overcoming, or at least alleviating, at least some of the above-mentioned problems and drawbacks. As a result, the above-mentioned object is achieved.

According to a fourth aspect of the invention, the object is achieved by a method of providing a disc stack of frustoconical separation discs configured to be mounted in a separation chamber of a centrifugal separator, preferably a crankcase gas separator, wherein the method comprises:

stacking the discs upon each other in a manner forming narrow separation spaces between adjacent discs, and welding the discs to each other at radially outer portions of the discs.

Since the method comprises the step of welding the discs to each other at radially outer portions of the discs, a quick and cost-efficient method is provided for manufacturing a rigid and durable disc stack.

Accordingly, a method is provided overcoming, or at least alleviating, at least some of the above-mentioned problems and drawbacks. As a result, the above-mentioned object is achieved.

Optionally, each disc comprises at least one welding section, and wherein the step of welding the discs to each other comprises the step of:

welding the discs to each other by welding the welding sections of adjacent discs to each other.

Thereby, a quicker and more cost-efficient method is provided for manufacturing disc stack. Moreover, a more rigid and durable disc stack can be provided when using the method.

Optionally, the method comprises the step of:

aligning the welding sections of the discs before the step of welding the discs to each other.

Thereby, a quicker and more cost-efficient method is provided for manufacturing the disc stack. This is because the subsequent step of welding the discs to each other is significantly facilitated. Moreover, a more rigid and durable disc stack can be provided when using the method.

Optionally, the step of aligning the welding sections of the discs comprises the step of:

aligning the welding sections of the discs to positions allowing a continuous weld of the welding sections before the step of welding the discs to each other.

Thereby, a quicker and more cost-efficient method is provided for manufacturing disc stack. This is because the subsequent step of welding the discs to each other is significantly facilitated. Moreover, an even more rigid and durable disc stack can be provided when using the method.

Optionally, the discs comprise spacers forming the narrow separation spaces between adjacent discs, and wherein the method comprises the step of:

compressing the disc stack in an axial direction thereof, before, and/or during, the step of welding the discs to each other.

Thereby, a more rigid and durable disc stack is provided when using the method. This is because the compression of the disc stack in the axial direction thereof ensures uniform narrow separation spaces between adjacent discs which can be provided in a quick, simple, and reliable manner when using the method. Moreover, the compression force may ensure a rigid and durable disc stack in a quick manner. Furthermore, the need for a compression spring compressing the disc stack in the axial direction thereof is circumvented. This is because the welded portions of the discs may ensure that a compression force is obtained between the discs of the disc stack. Accordingly, due to these features, a lighter, more rigid, and durable disc stack can be provided in a cost efficient manner when using the method.

According to a fifth aspect of the invention, the object is achieved by a method of providing a rotor unit for a centrifugal separator, preferably a crankcase gas separator, wherein the rotor unit comprises frustoconical separation discs and a first and a second end disc, wherein the method comprises:

stacking the separation discs upon each other onto one of the first and second end discs to form a disc stack of separation discs having a first axial end facing the end disc and narrow separation spaces between adjacent discs, placing the other end disc of the first and second end discs at a second axial end of the disc stack, and welding the discs to each other at radially outer portions of the discs.

Since the method comprises the step of welding the discs to each other at radially outer portions of the discs, a quick and cost-efficient method is provided for manufacturing a rigid and durable rotor unit for a centrifugal separator.

Accordingly, a method is provided overcoming, or at least alleviating, at least some of the above-mentioned problems and drawbacks. As a result, the above-mentioned object is achieved.

Optionally, the discs comprise spacers forming the narrow separation spaces between adjacent discs, and wherein the method comprises the step of:

compressing the rotor unit in an axial direction thereof, before, and/or during, the step of welding the discs to each other.

Thereby, a more rigid and durable rotor unit is provided when using the method. This is because the compression of the rotor unit in the axial direction thereof ensures uniform narrow separation spaces between adjacent discs which can be provided in a quick, simple, and reliable manner when using the method. Moreover, the compression force may ensure a rigid and durable rotor unit in a quick manner. Furthermore, the need for a compression spring compressing the disc stack in the axial direction thereof is circumvented. This is because welded portions of the discs may ensure that a compression force is obtained between the discs of the rotor unit. Accordingly, due to these features, a lighter, more rigid, and durable rotor unit can be provided in a cost efficient manner when using the method.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
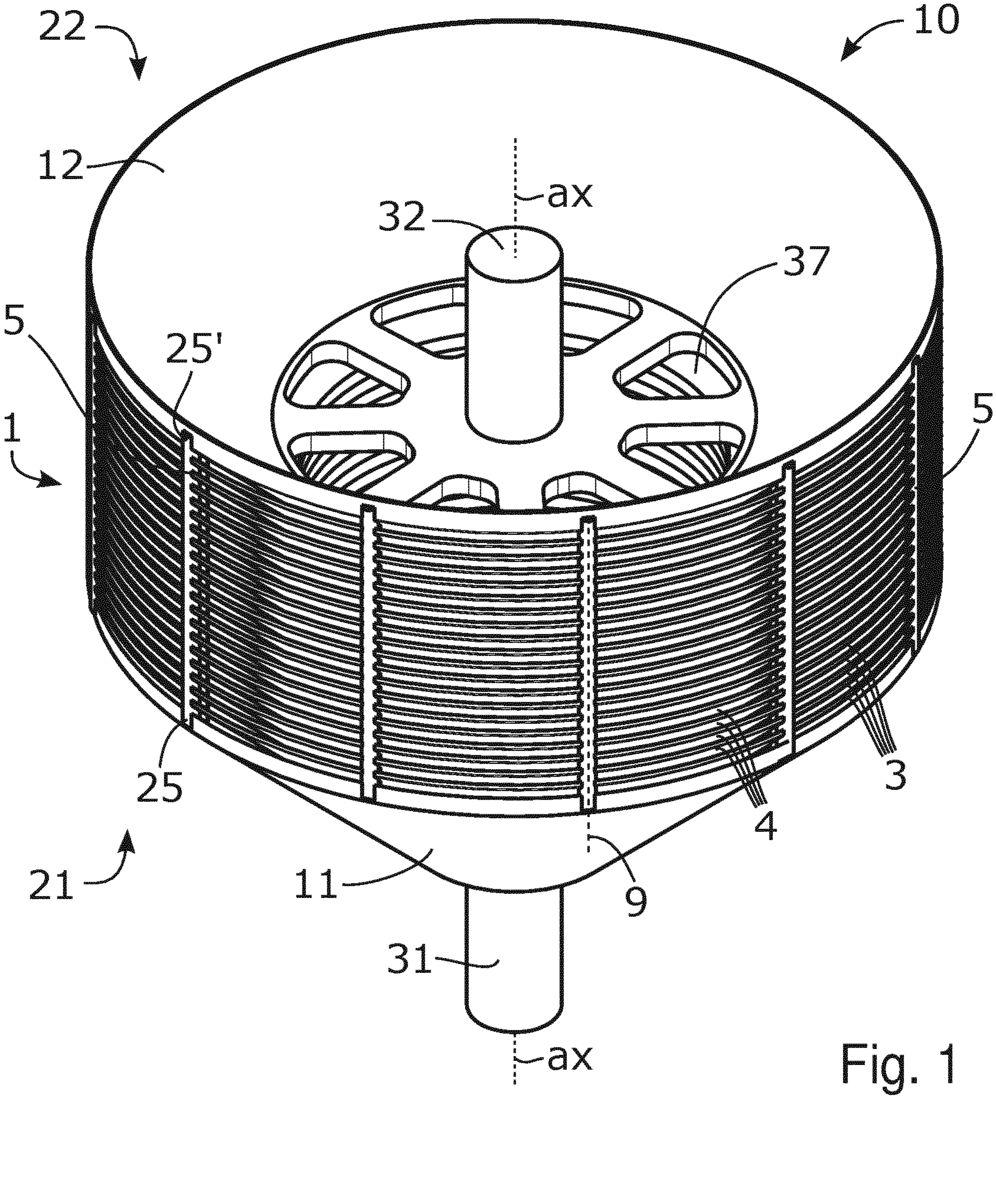
FIG. 1 illustrates a perspective view of a rotor unit, according to some embodiments, in an assembled state.

FIG. 1 illustrates a perspective view of a rotor unit 10, according to some embodiments, in an assembled state. The rotor unit 10 is configured to be mounted in a separation chamber of a centrifugal separator, such as in a separation chamber of a crankcase gas separator, as is further explained herein. The rotor unit 10 is configured to rotate around a rotation axis ax during operation in the centrifugal separator so as to separate matter having different densities. According to the illustrated embodiments, the rotor unit 10 comprises a drive shaft 31 for connection to a drive arrangement and a supporting shaft 32 for connection to a support arrangement, such as a bearing, as is further explained herein.

The rotor unit 10 comprises a disc stack 1 of frustoconical separation discs 3. For the reason of brevity and clarity, the separation discs 3 are in some places herein referred to as "the discs 3". As can be seen in FIG. 1, the discs 3 are stacked upon each other in a manner forming narrow separation spaces 4 between adjacent discs 3. Moreover, the discs 3 of the disc stack 1 are welded to each other at radially outer portions 5 of the discs 3, which provides several advantages, as is further explained herein.

According to the illustrated embodiments, the rotor unit 10 comprises a first end disc 11 at a first axial end 21 of the disc stack 1, and a second end disc 12 at a second axial end 22 of the disc stack 1. The discs 3 of the disc stack 1 may be made of a polymeric material, i.e. a non-metallic material. Likewise, the first and second end discs 11, 12 may also be made of a polymeric material. Purely as an example, the discs 3, 11, 12 may be made of a fibre-reinforced polymer, such as fibreglass. Moreover, the discs 3, 11, 12 may be made of polyamide or nylon, such as PA66, with or without a fibre-reinforced polymer, such as fibreglass. According to some embodiments, the discs 3 of the disc stack 1 and the first and second end discs 11, 12 are made of the same material. In this manner, welding of the discs 3, 11, 12 to each other is facilitated and a continuous, coherent, and strong weld can be provided, as is further explained herein. The first and second end discs 11, 12 are more structurally rigid than the discs 3 of the disc stack 1.

Moreover, according to the illustrated embodiments, each of the first and second end discs 11, 12 is welded to the disc stack 1 at radially outer portions 25, 25' of the end disc 11, 12 and radially outer portions 5 of adjacent discs 3 of the disc stack 1, which provides several advantages, as is further explained herein.

Figure 2:
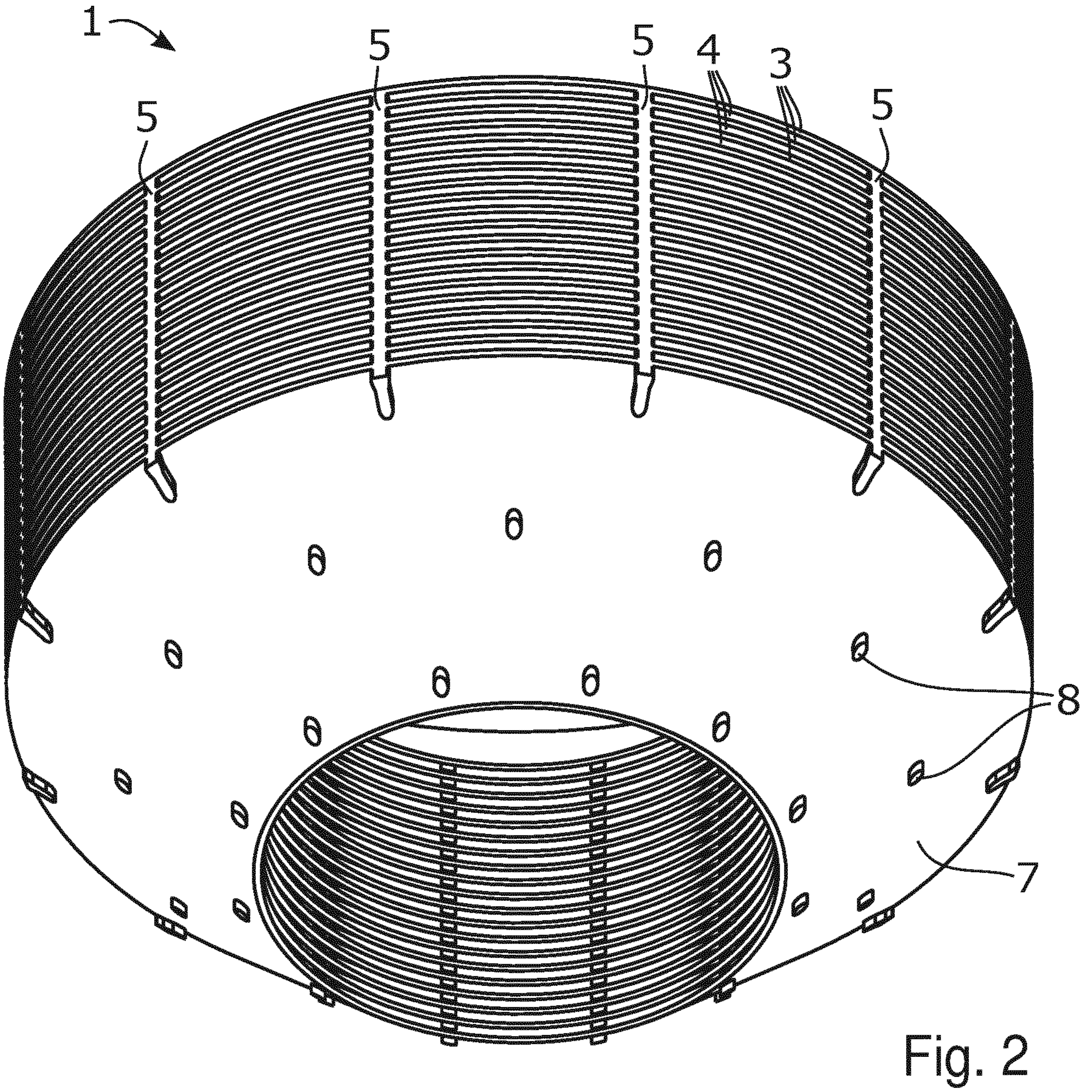
FIG. 2 illustrates a disc stack of the rotor unit illustrated in FIG. 1.

FIG. 2 illustrates the disc stack 1 of the rotor unit 10 illustrated in FIG. 1. As mentioned above, the disc stack 1 comprises frustoconical separation discs 3. The discs 3 are stacked upon each other in a manner forming narrow separation spaces 4 between adjacent discs 3. Moreover, as can be seen in FIG. 2, the discs 3 of the disc stack 1 are welded to each other at radially outer portions 5 of the discs 3.

Figure 3:
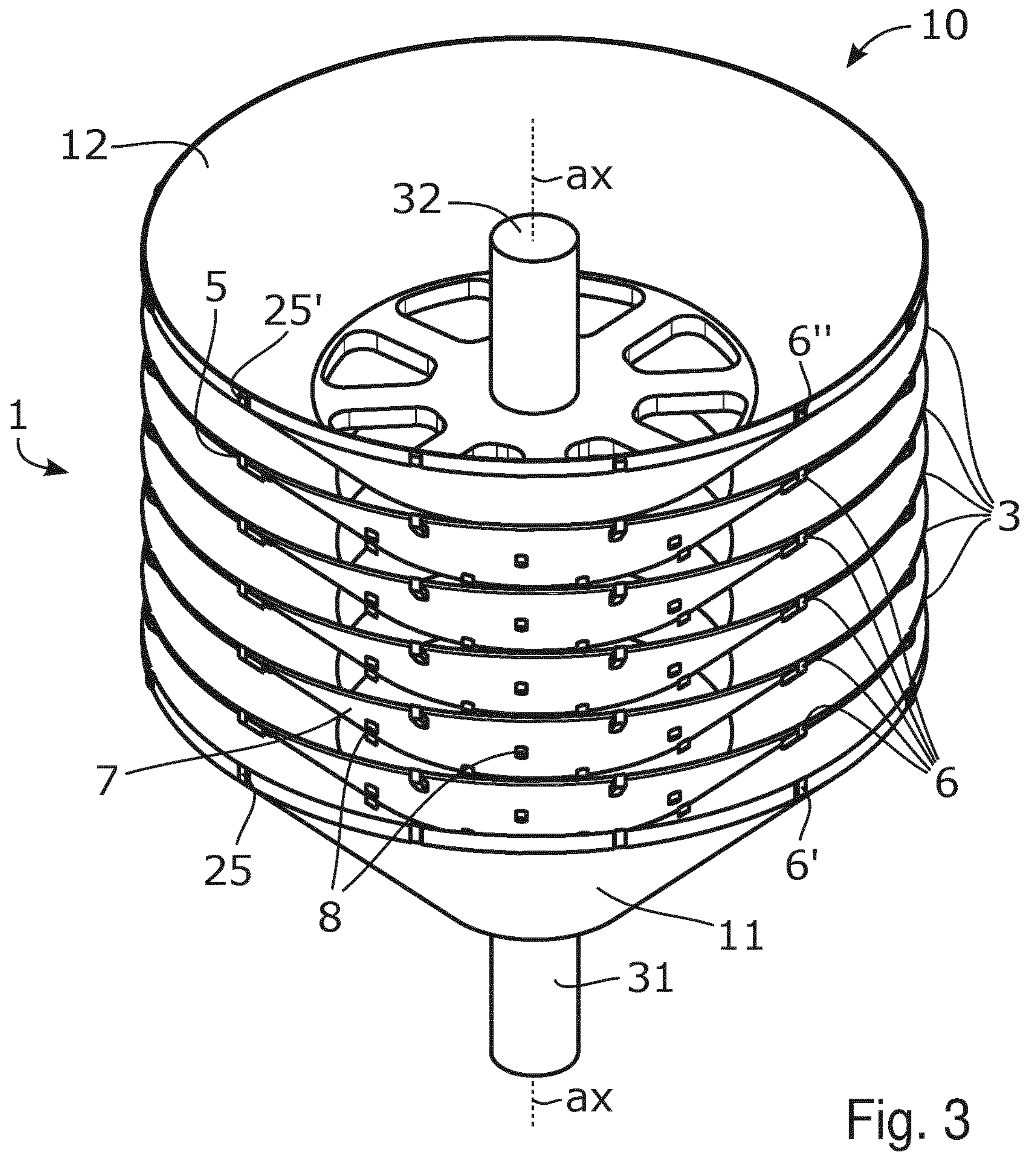
FIG. 3 illustrates a perspective view of a rotor unit according to the embodiments illustrated in FIG. 1, in a disassembled state.

FIG. 3 illustrates a perspective view of a rotor unit 10 according to the embodiments illustrated in FIG. 1, in a disassembled state. As can be seen in FIG. 3, the discs 3 comprise welding sections 6 at radially outer portions 5 of the discs 3. As is further explained herein, when assembling the disc stack 1 according to the illustrated embodiments, the discs 3 are welded to each other via the welding sections 6.

According to the illustrated embodiments, each disc 3 comprises twelve welding sections 6 positioned at equal distances from each other around a circumference of the respective disc 3. According to further embodiments, each disc 3 may comprises at least three welding sections 6, or at least six welding sections 6, which may be positioned at equal distances from each other around the circumference of the respective disc 3.

The discs 3 of the disc stack 1 comprise spacers 8 protruding from a frustoconical surface 7 of the respective disc 3. Spacers 8 protruding from a frustoconical surface 7 of one of the discs 3 is also seen and indicated in FIG. 2. The spacers 8 form the narrow separation spaces 4 between adjacent discs 3, indicated in FIG. 1 and FIG. 2.

Figure 4:
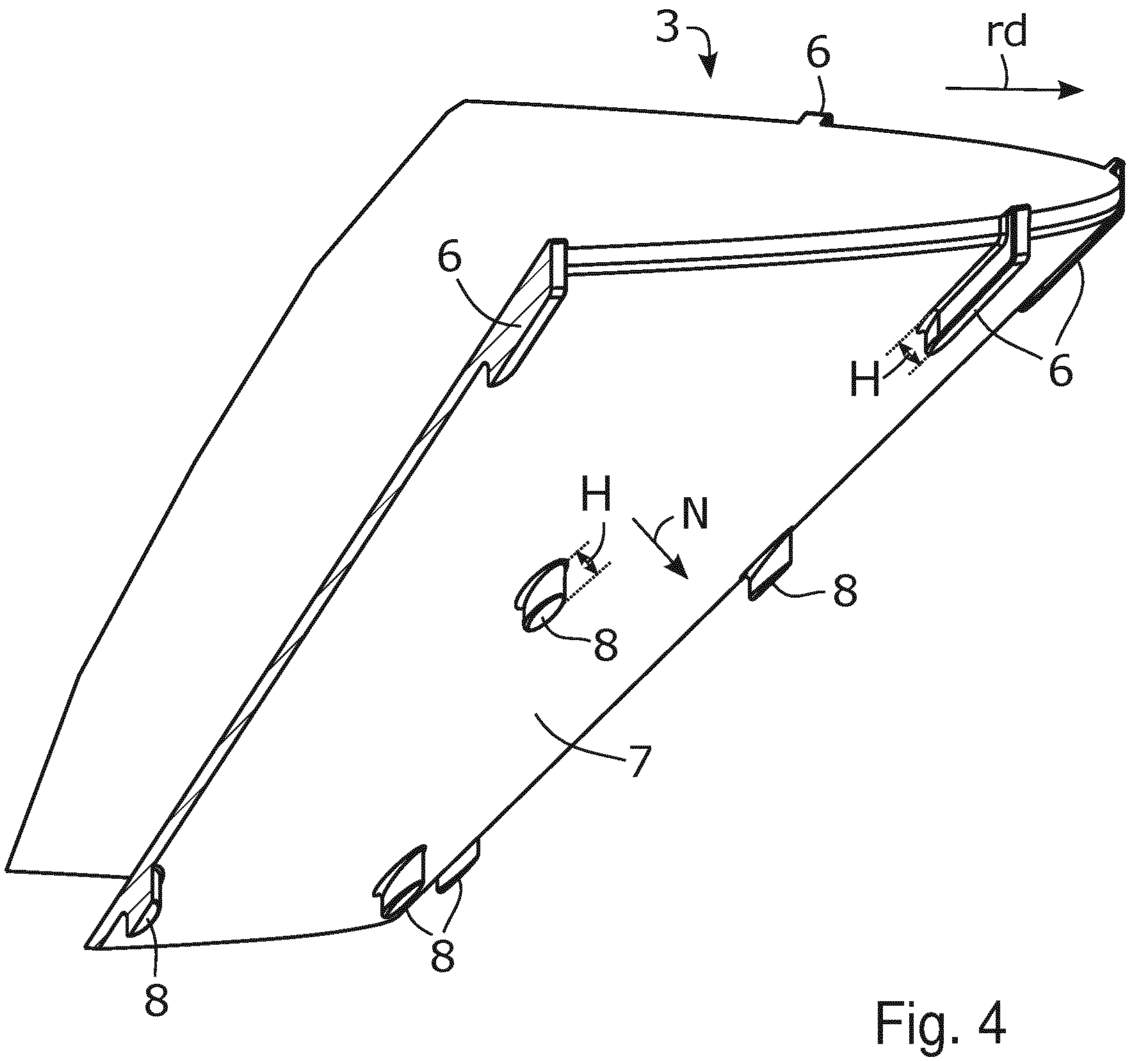
FIG. 4 illustrates a portion of a separation disc of a disc stack illustrated in FIG. 1-FIG. 3.

FIG. 4 illustrates a portion of a separation disc 3 of the disc stack 1 illustrated in FIG. 1-FIG. 3. As indicated in FIG. 4, the spacers 8 protrudes from the frustoconical surface 7 of the respective disc 3 in a direction of a surface normal N of the frustoconical surface 7. The is height H of the spacers 8, measured in the direction of the surface normal N, corresponds to the width of the narrow separation spaces 4 between adjacent discs 3, indicated in FIG. 1-FIG. 3. The height H of the spacers 8, measured in the direction of the surface normal N, may for example be within the range of 0.15 mm to 1 mm, more preferably 0.20 mm to 0.60 mm. Moreover, due to the spacers 8 which protrude from the frustoconical surface 7 of the respective disc 3 in a direction of the surface normal N, uniform narrow separation spaces between adjacent discs can be provided in a quick, simple, and efficient manner by compressing the disc stack in an axial direction thereof, as is further explained herein.

Moreover, as can be seen in FIG. 3 and FIG. 4, the welding sections 6 also protrude from the frustoconical surface 7 of the respective disc 3. As indicated in FIG. 4, according to the illustrated embodiments, the height H of the welding sections 6, measured in the direction of the surface normal N of the frustoconical surface 7, corresponds to the height H of the spacers 8, measured in the direction of the surface normal N. Thus, according to the illustrated embodiments, the height H of the welding sections 6, measured in the direction of the surface normal N of the frustoconical surface 7, also corresponds to the width of the narrow separation spaces 4 between adjacent discs 3, indicated in FIG. 1-FIG. 3. In this manner, the welding sections 6 separate the discs 3 in a manner forming at least portions of the narrow separation spaces 4 between adjacent discs 3, indicated in FIG. 1-FIG. 3. Moreover, due to these features, a continuous and coherent weld of welding sections 6 can be provided in a quick, simple, and efficient manner.

Furthermore, as can be seen in FIG. 3 and FIG. 4, according to the illustrated embodiments, the welding sections 6 protrude radially from the respective disc 3. A radial direction rd of the disc 3 is indicated in FIG. 4. Since the welding sections 6 protrude radially from the respective disc 3, the process of aligning the welding sections 6 is facilitated, before or during welding the discs 3 to each other via the welding sections 6, as is further explained herein. Moreover, since the welding sections 6 protrude radially from the respective disc, the process of welding the discs 3 to each other is facilitated. It should be noted that embodiments where the welding sections 6 does not protrude radially from the respective disc 3 is also contemplated.

It should also be noted that the radially protruding welding sections 6 may be arranged to not protrude radially beyond the radius of the discs 3 after welding, i.e. in the assembled state when the welding sections 6 have been welded to each other.

According to embodiments, the welding sections 6 may be aligned before welding the discs 3 to each other using a fixture, or the like.

Figure 5:
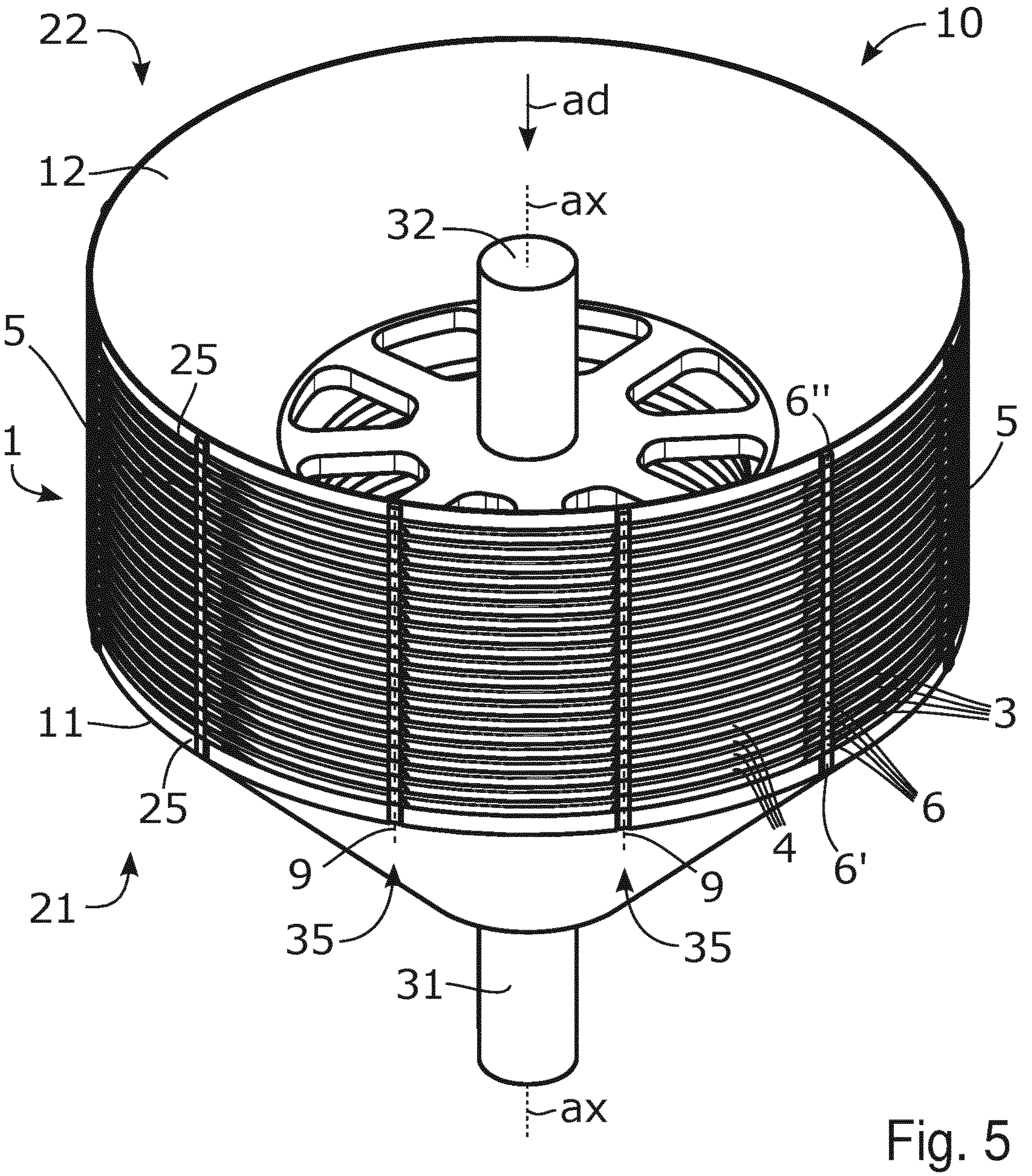
FIG. 5 illustrates a perspective view of a rotor unit according to the embodiments illustrated in FIG. 1 and FIG. 3, in a partially assembled state.

FIG. 5 illustrates a perspective view of a rotor unit 10 according to the embodiments illustrated in FIG. 1 and FIG. 3, in a partially assembled state. In FIG. 5, the separation discs 3 are stacked upon each other onto the first end discs 11 to form a disc stack 1 of separation discs 3 having a first axial end 21 facing the first end disc 11 and narrow separation spaces 4 between adjacent discs 3, 11. Moreover, the second end disc 12 is placed at a second axial end 22 of the disc stack 1.

In FIG. 5, the rotor unit 10 is illustrated in a state before welding of the discs 3, 11, 12 to each other. According to the illustrated embodiments, each of the first and second end discs 11, 12 comprises welding sections 6', 6". For the reason of brevity and clarity, the first and second end discs 11, 12 are in some places herein referred to as "the discs 11, 12". As can be seen in FIG. 5, the welding sections 6, 6', 6" of the discs 3, 11, 12 are aligned to positions allowing a continuous and coherent weld of the welding sections 6, 6', 6". In FIG. 5, the welding sections 6, 6', 6" of the discs 3, 11, 12 are aligned to positions in which the welding sections 6, 6', 6" extend along lines 9 and form rows 35 of welding sections 6, 6', 6". Moreover, in FIG. 5, the welding sections 6, 6', 6" of the discs 3, 11, 12 are aligned to positions in which the welding sections 6, 6', 6" extend along a respective straight line 9 being substantially parallel to a rotation axis ax of the disc stack 1. In this manner, the welding sections 6, 6', 6" of the discs 3 can be welded to each other to provide a continuous and coherent weld along the lines 9 in a quick, simple, and efficient manner.

According to further embodiments, the welding sections 6, 6', 6" of the discs 3, 11, 12 may be aligned to positions in which the welding sections 6, 6', 6" extend along curved lines. As an example, the welding sections 6, 6', 6" of the discs 3, 11, 12 may be aligned to positions in which the welding sections 6, 6', 6" form a partial helix shaped pattern of welding sections 6, 6', 6".

In the following, an assembling process of the rotor unit 10 will be explained. The assembling process may be performed by an assembler or by an assembling machine. In the assembling process, the separation discs 3 may be stacked, i.e. placed, upon each other onto the first end disc 11 to form a disc stack 1 of separation discs 3 having a first axial end 21 facing the first end disc 11 and narrow separation spaces 4 between adjacent discs 3, 11. Moreover, the second end disc 12 may be placed at a second axial end 22 of the disc stack 1.

Before welding the discs 3, 11, 12 to each other, the welding sections 6, 6', 6" of the discs 3, 11, 12 may be aligned to positions allowing a continuous and coherent weld of the welding sections 6, 6', 6". The process of aligning the welding sections 6, 6', 6" may be performed during or after the process of stacking the discs 3, 11, 12 onto each other. After the stacking of the discs 3, 11, 12 and the alignment of the welding sections 6, 6', 6", a rotor unit 10 is provided as illustrated in FIG. 5.

Before, and/or during, the welding of the welding sections 6, 6', 6", the rotor unit 10 may be compressed in an axial direction ad thereof. The compression of the rotor unit 10 may be obtained by applying opposing forces onto the first and second end discs 11, 12 in the axial direction ad of the rotor unit 10. According to some embodiments, the rotor unit 10 is compressed in the axial direction ad thereof during welding of the discs 3, 11, 12 to each other by welding the welding sections 6 of adjacent discs 3, 11, 12 to each other. In this manner, uniform narrow separation spaces 4 between adjacent discs 3, 11, 12 can be provided in a quick, simple, and reliable manner. Moreover, the compression force may ensure a rigid and durable rotor unit 10. Furthermore, the need for a compression spring compressing the rotor unit 10 in the axial direction ad thereof is circumvented. This is because when welded, the welding sections 6, 6', 6" may ensure that a compression force is obtained between the discs 3, 11, 12 of the rotor unit 10.

During the welding, at least parts of the welding sections 6, 6', 6" are melted and are joined together when cooling, which causes fusion between the welding sections 6, 6', 6". When welded, a rotor unit 10 is provided as illustrated in FIG. 1. The discs 3, 11, 12 of the rotor unit 10 may be welded to each other using ultra-sonic welding, heated-tool welding, or the like.

Figure 6:
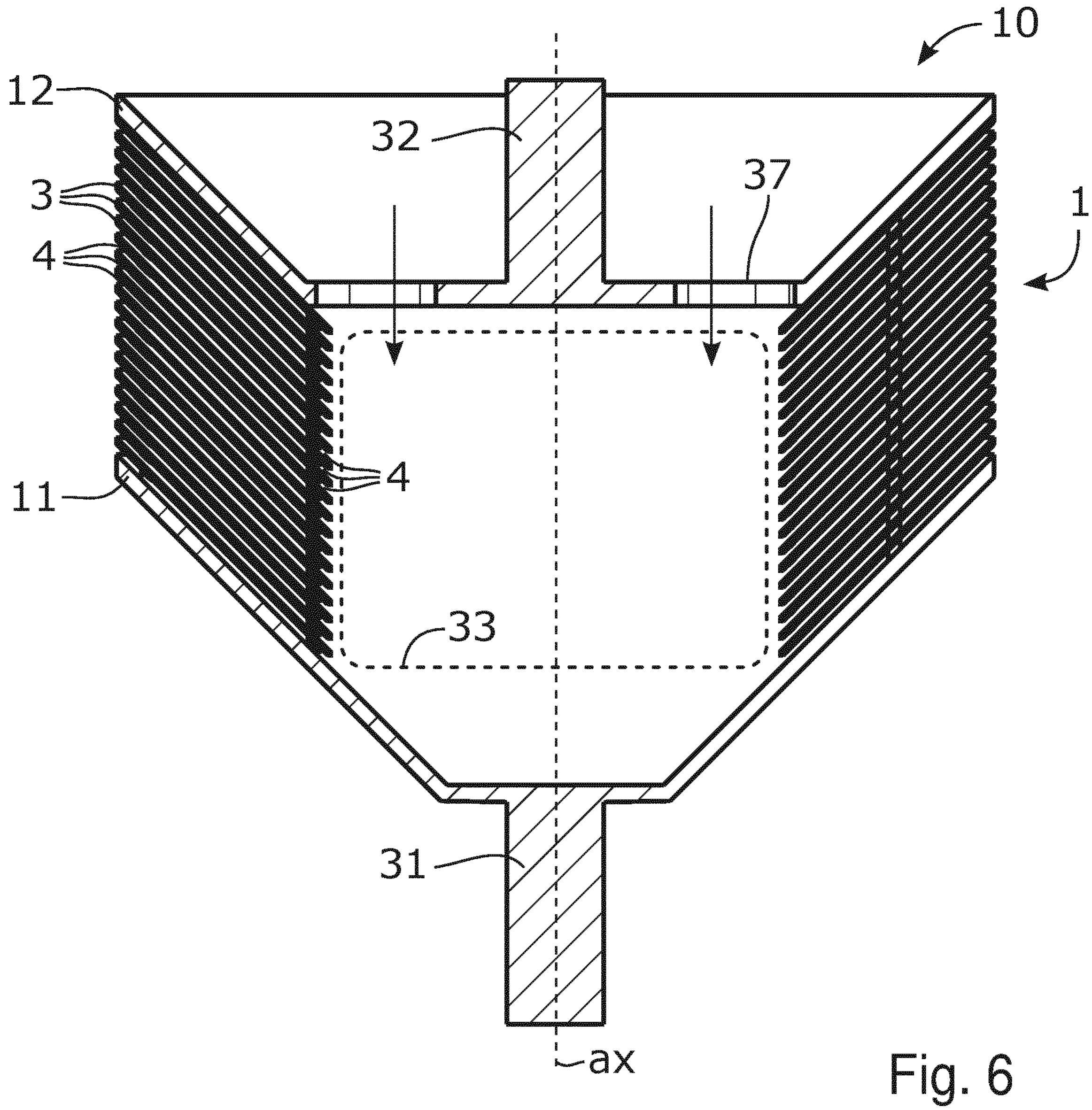
FIG. 6 illustrates a cross section of a rotor unit according to the embodiments illustrated in FIG. 1, FIG. 3, and FIG. 5.

FIG. 6 illustrates a cross section of a rotor unit 10 according to the embodiments illustrated in FIG. 1, FIG. 3, and FIG. 5. The cross section of FIG. 6 is made in a plane comprising the rotation axis ax of the rotor unit 10.

According to the illustrated embodiments, drive shaft 31 of the rotor unit 10 is connected to the first end disc 11. As an alternative, or in addition, the drive shaft 31 of the rotor unit 10 may be connected to the second end disc 12. Furthermore, according to some embodiments, the drive shaft 31 may be integrated with one or both of the first and second end discs 11, 12. According to the illustrated embodiments, the discs 3 of the disc stack 1 are rotationally locked to the drive shaft 31 only via welds at radially outer portions 5 of the discs 3. In this manner, a rotor unit 10 is provided having conditions for an improved fluid flow characteristics, as is further explained herein. Moreover, a rotor unit 10 is provided having conditions for having low weight.

According to the illustrated embodiments, the rotor unit 10 comprises a hollow space 33 radially inside the discs 3 of the disc stack 1. The hollow space 33 extends through the rotation axis ax. That is, according to the illustrated embodiments, the shafts 31, 32 of the rotor unit, i.e. the drive shaft 31 and the supporting shaft 32 do not extend into the hollow space 33 radially inside the discs 3 of the disc stack 1. Accordingly, a shaft-less hollow space 33 is provided radially inside the discs 3 of the disc stack 1. In this manner, improved flow characteristics is provided of fluid flowing through the rotor unit 10 during operation of the rotor unit 10, i.e. fluid flowing through the hollow space 33 from inlet apertures 37 in the second end disc 12 to the narrow separation spaces 4 between adjacent discs 3, 11, 12. The inlet apertures 37 in the second end disc 12 are also indicated in FIG. 1.

Figure 7:
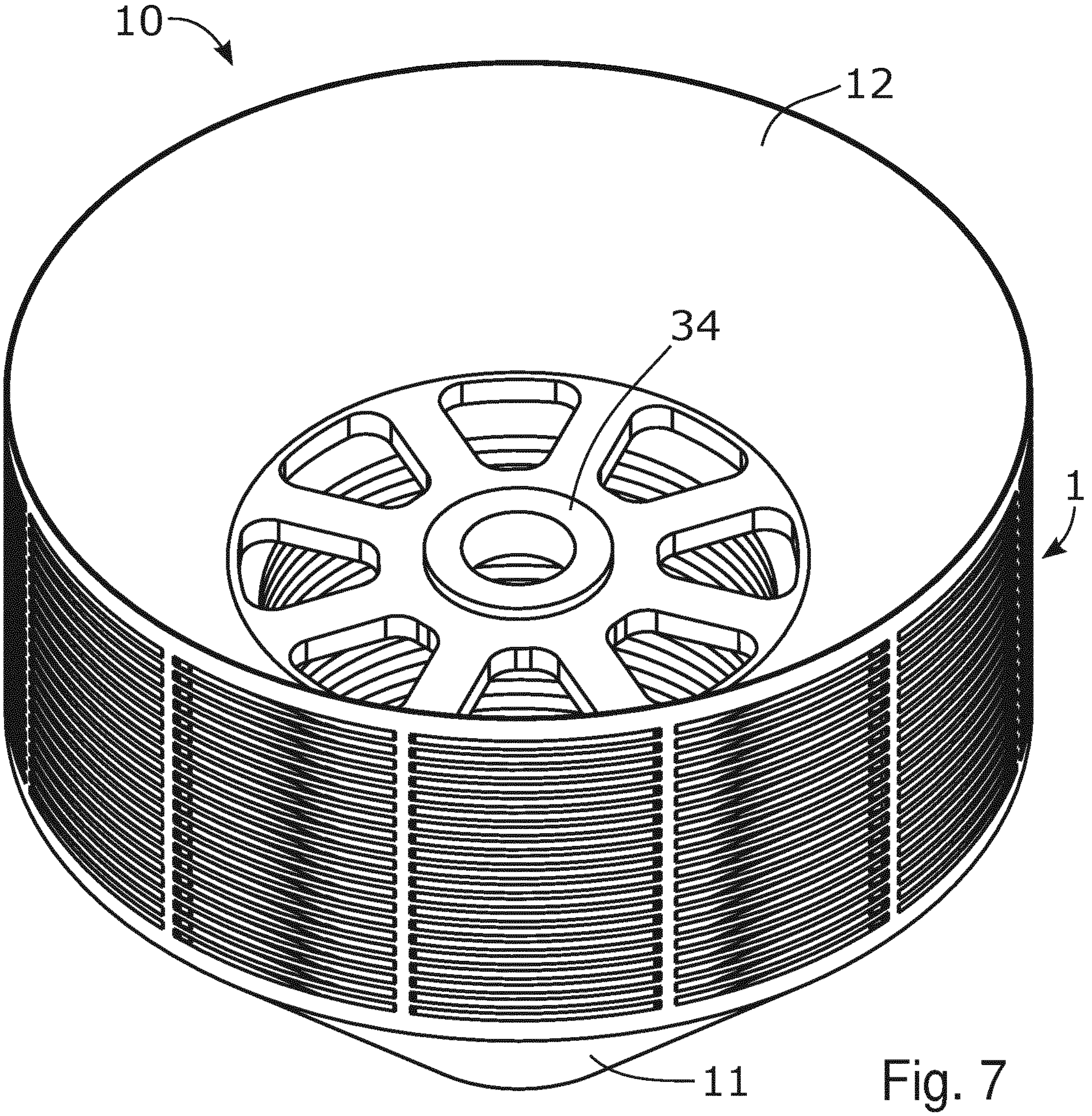
FIG. 7 illustrates a rotor unit according to some further embodiments, FIG. 8 schematically illustrates a cross section through a centrifugal separator, according to some embodiments.

FIG. 7 illustrates a rotor unit 10 according to some further embodiments. The rotor unit 10 illustrated in FIG. 7 comprises the same features, functions, and advantages as the rotor unit 10 illustrated in FIG. 1, FIG. 3, FIG. 5, and FIG. 6, with some exceptions explained below. According to the embodiments illustrated in FIG. 7, the rotor unit 10 comprises a drive shaft interface 34 for connection of a drive shaft to the rotor unit 10. According to the illustrated embodiments, the drive shaft interface 34 is connected to the second end disc 12. Thus, according to the illustrated embodiments, the drive shaft interface 34 is configured to connect a drive shaft to the second end disc 12. As an alternative, or in addition, the drive shaft interface 34 may be configured to connect a drive shaft to the first end disc 11.

Figure 8:
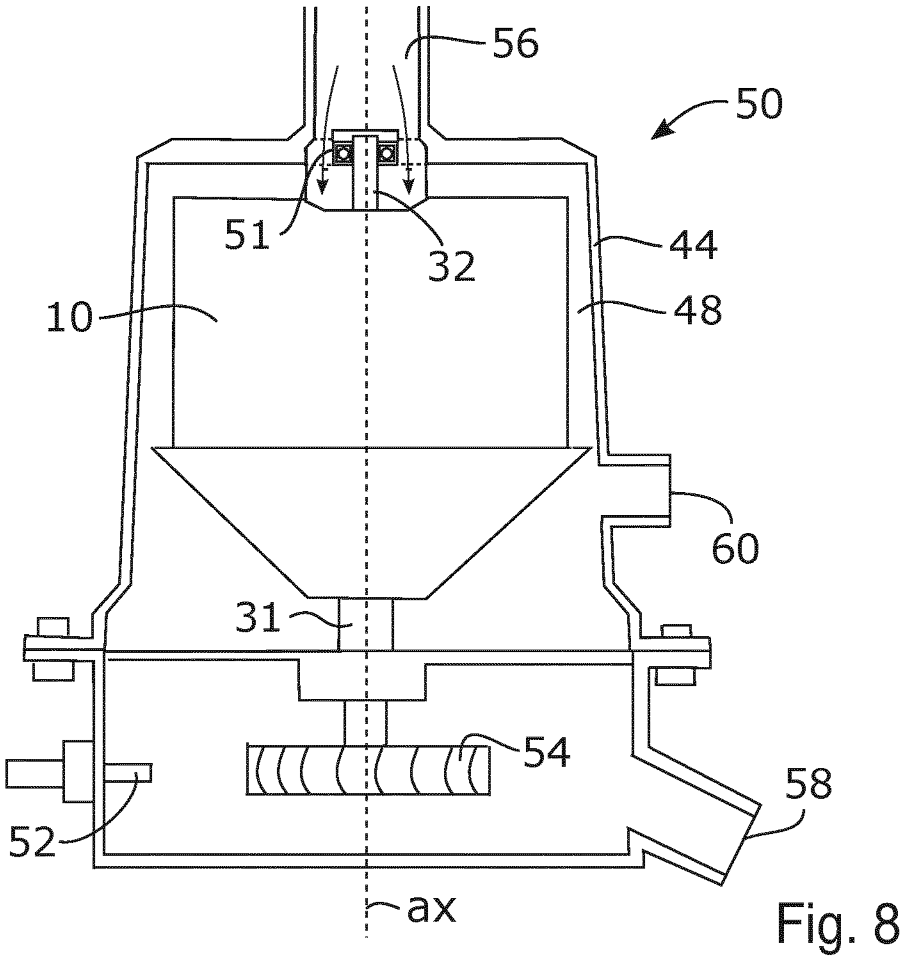

FIG. 8 schematically illustrates a cross section through a centrifugal separator 50, according to some embodiments. The centrifugal separator 50 comprises a rotor unit 10 according to the embodiments illustrated in FIG. 1, FIG. 3, FIG. 5, and FIG. 6. According to the illustrated embodiments, the centrifugal separator 50 is a crankcase gas separator configured to separate a liquid phase, as well as particles and/or substances, from crankcase gases of an internal combustion engine using the rotor unit 10. According to further embodiments, the centrifugal separator 50 may be another type of rotor separator configured to separate liquid phases, particles and/or substances from other types of fluids than exhaust gases. The centrifugal separator 50 comprises a housing 44 forming a separation chamber 48. The housing 44 is a stationary housing 44 which means that it is arranged to be stationary relative the internal combustion engine during operation. The centrifugal separator 50 comprises an inlet 56 for inflow of gases into the separation chamber 48. Moreover, the centrifugal separator 50 comprises a bearing 51 holding and supporting the supporting shaft 32 and a drive arrangement 52, 54 configured to rotate the rotor unit 10 around the rotation axis ax by applying a torque to the drive shaft 31.

The centrifugal separator 50 illustrated in FIG. 8 comprises a hydraulic drive arrangement 52, 54 with a hydraulic nozzle 52 and turbine wheel 54. The hydraulic nozzle 52 may be connected to an engine oil circuit of the internal combustion engine. According to such embodiments, during operation of the internal combustion engine, oil may be pumped through the hydraulic nozzle 52 onto a turbine wheel 54 connected to the drive shaft 31 to thereby rotate the drive shaft 31 and the rotor unit 10. As an alternative, the centrifugal separator 50 may comprise another type of hydraulic drive arrangement, such as a reaction drive where a liquid jet is discharged from a rotor in a tangential direction, at a position offset from the rotational axis of the rotor, thereby providing the rotational force of the rotor. As a further alternative, the centrifugal separator 50 may comprise an electric drive arrangement, such as an electric motor arranged to rotate the drive shaft 31 and the rotor unit 10. As a still further alternative, the centrifugal separator 50 may comprise a turbine wheel connected to the drive shaft 31, where the turbine wheel is arranged to be driven by exhaust gases from the internal combustion engine to rotate the drive shaft 31 and the rotor unit 10. Moreover, as a still further alternative, the centrifugal separator 50 may comprise a mechanical drive arrangement configured to rotate the drive shaft 31 and the rotor unit 10, i.e. by connection via a drive belt to a generator drive shaft, or the like.

The centrifugal separator 50 illustrated in FIG. 8 comprises an inlet 56 for the crankcase gas around the supporting shaft 32. However, the centrifugal separator 50 may comprise a separate inlet for the crankcase gas in an upper region of the housing 44. From the inlet 56, the crankcase gas is ducted into the rotor unit 10. For clarity and brevity, the separation discs are not illustrated in FIG. 8. During rotation of the rotor unit 10, oil particles, as well as other particles and/or substances, from the crankcase gas is separated from the gas. The separated oil particles, and other particles and/or substances, are led to an oil outlet 58 of the centrifugal separator 50, which together with oil from the hydraulic nozzle 52 used to drive the wheel 54, is led back to the engine oil circuit of the internal combustion engine. The centrifugal separator 50 further comprises a cleaned crankcase gas outlet 60, where cleaned crankcase gas is led to an inlet of the internal combustion engine or is led out into the surrounding air.

It should be noted that the orientation of the inlet and the outlets, as well as the conical discs, may be varied without departing from the scope of the invention. Gas to be cleaned is led into the centre of the disc stack and rotor, travels radially outward within the disc stack, and leaves the disc stack at the periphery thereof as separated gas and particles. This can be accomplished through a gas inlet from above or below, with an outlet for cleaned gas being positioned above or below the disc stack, with the inner surface of the discs facing upward or downward.

Figure 9:
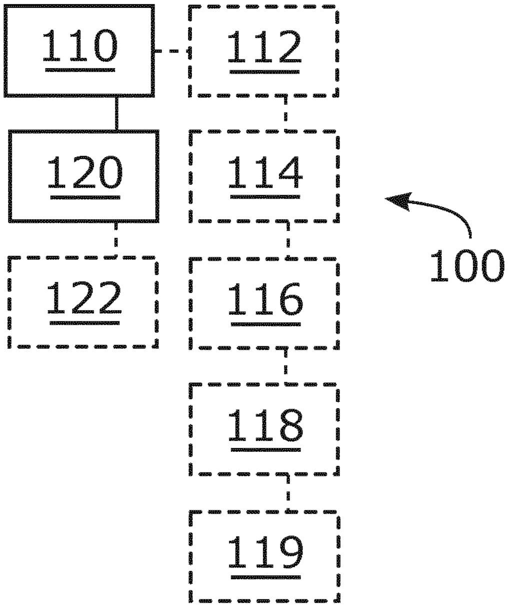
FIG. 9 illustrates a method of providing a disc stack of frustoconical separation discs configured to be mounted in a separation chamber of a centrifugal separator.

FIG. 9 illustrates a method 100 of providing a disc stack of frustoconical separation discs configured to be mounted in a separation chamber of a centrifugal separator. The method may encompass providing a disc stack 1 according to the embodiments illustrated in FIG. 1—FIG. 3 and FIG. 5-FIG. 7 being configured to be mounted in a separation chamber 48 of a centrifugal separator 50 according to the embodiments illustrated in FIG. 8. Moreover, some features are explained with reference to FIG. 4. Therefore, below, simultaneous reference is made to FIG. 1-FIG. 9. The method 100 illustrated in FIG. 9, is a method 100 of providing a disc stack 1 of frustoconical separation discs 3 configured to be mounted in a separation chamber 48 of a centrifugal separator 50. The method 100 comprises:

stacking 110 the discs 3 upon each other in a manner forming narrow separation spaces 4 between adjacent discs 3, and welding 120 the discs 3 to each other at radially outer portions 5 of the discs 3.

According to some embodiments, each disc 3 comprises at least one welding section 6, and wherein the step of welding 120 the discs 3 to each other comprises the step of:

welding 122 the discs 3 to each other by welding the welding sections 6 of adjacent discs 3 to each other.

As illustrated in FIG. 9, the method 100 may comprise the step of:

aligning 112 the welding sections 6 of the discs 3 before the step of welding 122 the discs 3 to each other.

Moreover, as illustrated in FIG. 9, the method 100 may comprise the step of:

aligning 114 the welding sections 6 of the discs 3 to positions allowing a continuous and coherent weld of the welding sections 6 before the step of welding 122 the discs 3 to each other.

As illustrated in FIG. 9, the method 100 may comprise the step of:

aligning 116 the welding sections 6 of the discs 3 to extend along a line 9 before the step of welding 122 the discs 3 to each other.

Moreover, as illustrated in FIG. 9, the method 100 may comprise the step of:

aligning 118 the welding sections 6 of the discs 3 to extend along a line 9 being substantially parallel to a rotation axis ax of the disc stack 1 before the step of welding 122 the discs to each other.

According to some embodiments, the discs 3 comprise spacers 8, 6 forming the narrow separation spaces 4 between adjacent discs 3, and wherein the method 100 comprises the step of:

compressing 119 the disc stack 1 in an axial direction ad thereof, before, and/or during, the step of welding 120, 122 the discs 3 to each other.

Figure 10:
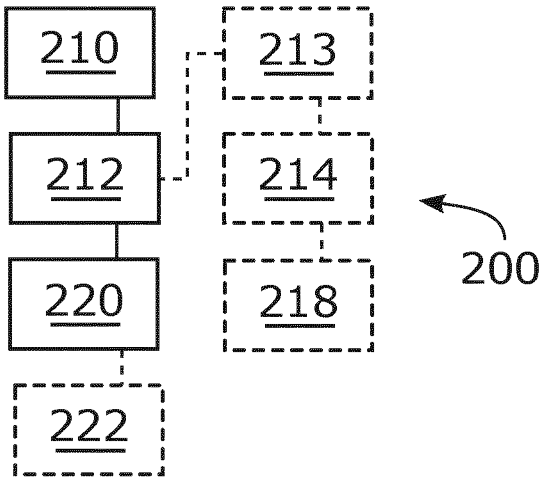
FIG. 10 illustrates a method of providing a rotor unit for a centrifugal separator.

FIG. 10 illustrates a method 200 of providing a rotor unit for a centrifugal separator. The rotor unit may be a rotor unit 10 according to the embodiments illustrated in FIG. 1, FIG. 3 and FIG. 5-FIG. 7 being configured to be mounted in a separation chamber 48 of a centrifugal separator 50 according to the embodiments illustrated in FIG. 8. Moreover, some features are explained with reference to FIG. 2 and FIG. 4. Therefore, below, simultaneous reference is made to FIG. 1-FIG. 8 and FIG. 10.

The method 200 illustrated in FIG. 10 is a method 200 of providing a rotor unit 10 for a centrifugal separator 50, wherein the rotor unit 10 comprises frustoconical separation discs 3 and a first and a second end disc 11, 12. The method 200 comprises:

stacking 210 the separation discs 3 upon each other onto one of the first and second end discs 11 to form a disc stack 1 of separation discs 3 having a first axial end 21 facing the end disc 11 and narrow separation spaces 4 between adjacent discs 3, 11, placing 212 the other end disc 12 of the first and second end discs 11, 12 at a second axial end 22 of the disc stack 1, and welding 220 the discs 3, 11, 12 to each other at radially outer portions 5, 25, 25' of the discs 3, 11, 12.

According to some embodiments, each disc 3, 11, 12 comprises at least one welding section 6, 6', 6", and wherein the step of welding 220 the discs 3, 11, 12 to each other comprises the step of:

welding 222 the discs 3, 11, 12 to each other by welding the welding sections 6, 6', 6" of adjacent discs 3, 11, 12 to each other.

As illustrated in FIG. 10, the method 200 may comprise the step of:

aligning 213 the welding sections 6, 6', 6" of the discs 3, 11, 12 before the step of welding 222 the discs 3, 11, 12 to each other.

Moreover, as illustrated in FIG. 10, the step of aligning 213 the welding sections 6, 6', 6" of the discs 3, 11, 12 may comprise the step of:

aligning 214 the welding sections 6, 6', 6" of the discs 3, 11, 12 to positions allowing a continuous and coherent weld of the welding sections 6, 6', 6" before the step of welding 222 the discs 3, 11, 12 to each other.

According to some embodiments, the discs 3, 11, 12 comprise spacers 8, 6 forming the narrow separation spaces 4 between adjacent discs 3, 11, 12, and wherein the method 200 comprises the step of:

compressing 218 the rotor unit 10 in an axial direction ad thereof, before, and/or during, the step of welding 220, 222 the discs 3, 11, 12 to each other.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A centrifugal separator for gas separation, comprising a disc stack of frustoconical separation discs configured to be mounted in a separation chamber of a centrifugal separator, the disc stack comprising:

discs stacked upon each other in a manner forming narrow separation spaces between adjacent discs, each of the discs having an upper surface and a lower surface;

a first end disc at a first axial end of the disc stack and a second end disc at a second axial end of the disc stack;

welding sections extending between the upper surfaces and lower surfaces of the discs, the welding sections extending in a radial direction of the discs, wherein the disc stack is configured to rotate around a rotation axis during operation, wherein the discs are welded to each other via the welding sections, and wherein the welding sections extend beyond a circumferential edge of the respective disc.

2. The centrifugal separator according to claim 1, wherein the discs are made of a non-metallic material.

3. The centrifugal separator according to claim 1, wherein the welding sections protrude from a frustoconical surface of the respective disc.

4. The centrifugal separator according to claim 1, wherein the welding sections separate the discs in a manner forming at least portions of the narrow separation spaces between adjacent discs.

5. The centrifugal separator according to claim 1, wherein each of the discs comprises at least three welding sections.

6. The centrifugal separator according to claim 1, wherein the discs are welded to each other along aligned welding sections.

7. The centrifugal separator according to claim 1, wherein each of the first and second end discs is welded to the disc stack at radially outer portions of the end disc and radially outer portions of a disc of the disc stack being adjacent to the end disc.

8. The centrifugal separator according to claim 1, further comprising a drive shaft interface for connection of a drive shaft to at least one of the first and second end discs, or a drive shaft connected to or integrated with at least one of the first and second end discs.

9. The centrifugal separator according to claim 8, wherein at least a proportion of the discs are rotationally locked to the drive shaft only via welds at radially outer portions of the discs.

10. The centrifugal separator according to claim 1, wherein the discs are made of a polymeric material.

* * * * *